(12) United States Patent
Lian et al.

(10) Patent No.: US 12,158,657 B2
(45) Date of Patent: Dec. 3, 2024

(54) ARRAY SUBSTRATE AND TOTAL REFLECTION DISPLAY PANEL

(71) Applicant: TCL CHINA STAR OPTOELECTRONICS TECHNOLOGY CO., LTD., Guangdong (CN)

(72) Inventors: Zhengqin Lian, Guangdong (CN); Ru Ge, Guangdong (CN); Ying Lu, Guangdong (CN); Lixia Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/759,852

(22) PCT Filed: Jul. 8, 2022

(86) PCT No.: PCT/CN2022/104724
§ 371 (c)(1),
(2) Date: Jul. 29, 2022

(87) PCT Pub. No.: WO2024/000627
PCT Pub. Date: Jan. 4, 2024

(65) Prior Publication Data
US 2024/0184165 A1    Jun. 6, 2024

(30) Foreign Application Priority Data

Jul. 1, 2022    (CN) .......................... 202210774097.6

(51) Int. Cl.
*G02F 1/1335*    (2006.01)
*G02F 1/1333*    (2006.01)
*G02F 1/1362*    (2006.01)

(52) U.S. Cl.
CPC .... *G02F 1/133553* (2013.01); *G02F 1/13338* (2013.01); *G02F 1/133504* (2013.01);
(Continued)

(58) Field of Classification Search
CPC ........... G02F 1/133553; G02F 1/13629; G02F 1/13338; G02F 1/133504; G02F 1/133514; G02F 2203/02
(Continued)

(56) References Cited

U.S. PATENT DOCUMENTS

2015/0348504 A1    12/2015    Sakariya et al.
2021/0011338 A1*    1/2021    Wu ................... G02F 1/133553

FOREIGN PATENT DOCUMENTS

CN    107102470 A    8/2017
CN    107817638 A *    3/2018    ............. G02F 1/167
(Continued)

OTHER PUBLICATIONS

International Search Report in International application No. PCT/CN2022/104724, mailed on Dec. 22, 2022.
(Continued)

*Primary Examiner* — Jessica M Merlin
*Assistant Examiner* — William D Peterson
(74) *Attorney, Agent, or Firm* — PV IP PC; Wei Te Chung

(57) ABSTRACT

An array substrate and a total reflection display panel are provided. The array substrate includes a first substrate, a touch control unit, and a total reflection layer. The touch control unit is disposed on a side of the total reflection layer facing the first substrate. Through arranging the touch unit on a side of the total reflection layer adjacent to the first substrate, a total reflection display is not affected, a close-range interaction function of the total reflection display
(Continued)

panel is enhanced through the touch unit, and a versatility of display application scenarios is increased.

18 Claims, 4 Drawing Sheets

(52) U.S. Cl.
CPC .... *G02F 1/133514* (2013.01); *G02F 1/13629* (2021.01); *G02F 2203/02* (2013.01)

(58) Field of Classification Search
USPC .......................................................... 349/113
See application file for complete search history.

(56) References Cited

FOREIGN PATENT DOCUMENTS

| | | |
|---|---|---|
| CN | 112859426 A | 5/2021 |
| CN | 113625485 A | 11/2021 |
| CN | 114020167 A | 2/2022 |
| JP | 2015227949 A | 12/2015 |

OTHER PUBLICATIONS

Written Opinion of the International Search Authority in International application No. PCT/CN2022/104724, mailed on Dec. 22, 2022.
Chinese Office Action issued in corresponding Chinese Patent Application No. 202210774097.6 dated May 29, 2023, pp. 1-7.

* cited by examiner

ARRAY SUBSTRATE AND TOTAL REFLECTION DISPLAY PANEL

FIELD OF DISCLOSURE

The present disclosure relates to the field of total reflection display technology, and more particularly, to an array substrate and a total reflection display panel.

BACKGROUND OF DISCLOSURE

A total reflection display panel can be clearly displayed in a scenario of ambient light source, without backlight, and achieve a low energy consumption. It has a wide market application prospect as an outdoor display (billboard/bus stop sign/airport waiting sign). However, currently, enhancing a close-range interaction of the reflective display is difficult, which affects a diversity of display application scenarios.

Therefore, a conventional total reflection display panel has technical problems of low convenience and possibility of being applied to outdoor display products.

SUMMARY

The present application provides an array substrate and a total reflection display panel that can alleviate technical problems that a conventional total reflection display panel has low convenience and possibility of being applied to outdoor display products.

The present application provides an array substrate including:
- a first substrate;
- a first metal layer, wherein the first metal layer is disposed above the first substrate;
- a second metal layer, wherein the second metal layer is disposed on a side of the first metal layer away from the first substrate; and
- a total reflection layer, wherein the total reflection layer is disposed as a whole on a side of the second metal layer away from the first substrate;
- wherein the array substrate at least further includes a touch control unit, and the touch control unit is disposed on a side of the total reflection layer facing the first substrate.

Optionally, in some embodiments of the present application, the touch control unit includes a first electromagnetic touch wire and a second electromagnetic touch wire arranged in different layers, and the first electromagnetic touch wire and the second electromagnetic touch wire are arranged to intersect in a film thickness direction.

Optionally, in some embodiments of the present application, adjacent ones of the first electromagnetic touch wires are arranged in parallel to each other and adjacent ones of the second electromagnetic touch wires are arranged in parallel to each other.

Optionally, in some embodiments of the present application, the first metal layer is a gate layer, the second metal layer is a source and drain layer, the first electromagnetic touch wire and the gate layer are arranged in a same layer, and the second electromagnetic touch wire and the source and drain layer are arranged in a same layer.

Optionally, in some embodiments of the present application, the gate layer includes a gate, and the first electromagnetic touch wire and the gate are spaced apart from each other.

Optionally, in some embodiments of the present application, the source and drain layer includes a source and a drain, and the second electromagnetic touch wire is arranged spaced apart from the source and spaced apart from the drain.

Optionally, in some embodiments of the present application, the gate layer further includes a scan line arranged along a first direction, the source and drain layer include a data line arranged along a second direction, the first electromagnetic touch wire is arranged along the first direction, the second electromagnetic touch wire is arranged along the second direction, and the first electromagnetic touch wire and the second electromagnetic touch wire are perpendicular to each other in the film thickness direction.

Optionally, in some embodiments of the present application, the source and drain layer includes a source and a drain, and the source and the drain are disposed on a same side of the second electromagnetic touch wire.

Optionally, in some embodiments of the present application, at least three of the first electromagnetic touch wires form a first loop, and the first electromagnetic touch wires form a plurality of the first loops, at least three of the second electromagnetic touch wires form a second loop, and the second electromagnetic touch wires form a plurality of the second loops.

The present application provides a total reflection display panel including the array substrate as described in any one of the above-mentioned embodiments.

Optionally, in some embodiments of the present application, the total reflection display panel further includes a sub-pixel unit, a color resist unit disposed on a side of the sub-pixel unit away from the first substrate, and a ratio of an area of the color resist unit to an area of the sub-pixel unit is less than or equal to 1:2 in a film thickness direction.

Optionally, in some embodiments of the present application, at least one side of the total reflection display panel includes a chip disposing region, and the chip disposing region includes a central region and an edge region located outside the central region, the edge region is provided with a bonding chip, the first electromagnetic touch wire or the second electromagnetic touch wire is respectively connected to the bonding chip in the edge region, and the first electromagnetic touch wire or the second electromagnetic touch wire are arranged symmetrically with respect to the central region.

Optionally, in some embodiments of the present application, at least one side of the total reflection display panel includes a chip disposing region, and the chip disposing region includes a central region and an edge region located outside the central region, and the first electromagnetic touch wire and the second electromagnetic touch wire are respectively connected to different bonding chips.

Optionally, in some embodiments of the present application, the first electromagnetic touch wire is connected to the bonding chip in the edge region, and the second electromagnetic touch wire is connected to the bonding chip in the central region.

Optionally, in some embodiments of the present application, the first electromagnetic touch wire is connected to six outermost ones of the bonding chips at an end of the chip disposing region.

Optionally, in some embodiments of the present application, the bonding chips are arranged in an array, when a plurality of first electromagnetic touch wires or a plurality of second electromagnetic touch wires are arranged at equal intervals.

Optionally, in some embodiments of the present application, at least one side of the total reflection display panel includes a chip disposing region, and the chip disposing region includes a central region and an edge region located outside the central region, the first electromagnetic touch wire and the second electromagnetic touch wire are connected to a same bonding chip, the bonding chip includes a plurality of pins, and the plurality of pins are connected to the first electromagnetic touch wire or the second electromagnetic touch wire in a one-to-one correspondence.

Optionally, in some embodiments of the present application, the total reflection display panel is further provided with an optical compensation layer for increasing a viewing angle of light, the optical compensation layer is provided on a side of the total reflection layer away from the first substrate.

Optionally, in some embodiments of the present application, the optical compensation layer is a lens or a prism capable of diffusing light.

Optionally, in some embodiments of the present application, the optical compensation layer further includes a first optical compensation layer and a second optical compensation layer disposed on a surface of a side of the first optical compensation layer away from the first substrate, and a refractive index of the first optical compensation layer is greater than a refractive index of the second optical compensation layer.

Through arranging the touch unit on a side of the total reflection layer adjacent to the first substrate, a total reflection display is not affected, and the touch unit and the total reflection array substrate are integrated as a whole. A close-range interaction function of the total reflection display panel is enhanced through the touch unit, and a versatility of display application scenarios is increased.

BRIEF DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DESCRIPTION OF REFERENCE NUMERALS

| Ref. No. | Element Name | Ref. No. | Element Name |
|---|---|---|---|
| 10 | First substrate | 20 | First metal layer |
| 30 | Second metal layer | 40 | Total reflection layer |
| 50 | Gate insulation layer | 60 | Passivation layer |
| 70 | Metal barrier layer | 80 | First polyimide layer |
| 90 | Active layer | 100 | Liquid crystal |
| 110 | Barrier wall | 120 | Second polyimide layer |
| 130 | Transparent electrode layer | 140 | Planarization layer |
| 150 | Color resist unit | 160 | Black matrix |
| 170 | Second substrate | 180 | Bonding chip |
| 190 | Optical compensation layer | 201 | First electromagnetic touch wire |
| 202 | Gate | 301 | Second electromagnetic touch wire |
| 302 | Source | 303 | Drain |
| H1 | Central region | H2 | Edge region |
| 1901 | First optical compensation layer | 1902 | Second optical compensation layer |
| 1 | Array substrate | 2 | Total reflection display panel |

Detailed Description of Present Embodiments

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application. In addition, it should be understood that specific implementations described here are only used to illustrate and explain the present application and are not used to limit the present application. In the present application, if no explanation is made to the contrary, orientation words such as "upper" and "lower" usually refer to upper and lower directions of a device in an actual use or a working state and specifically refer to drawing directions in drawings. Also, "inner" and "outer" refer to an outline of the device.

A conventional total reflection display panel does not have a close-range interaction function, which makes it difficult to be applied in an outdoor scenario.

Therefore, there is an urgent need to provide a total reflection display panel, which can improve the close-range interaction function of the total reflection display panel, and alleviate technical problems that the conventional total reflection display panel has low convenience and possibility of being applied to outdoor display products.

Figure 1:
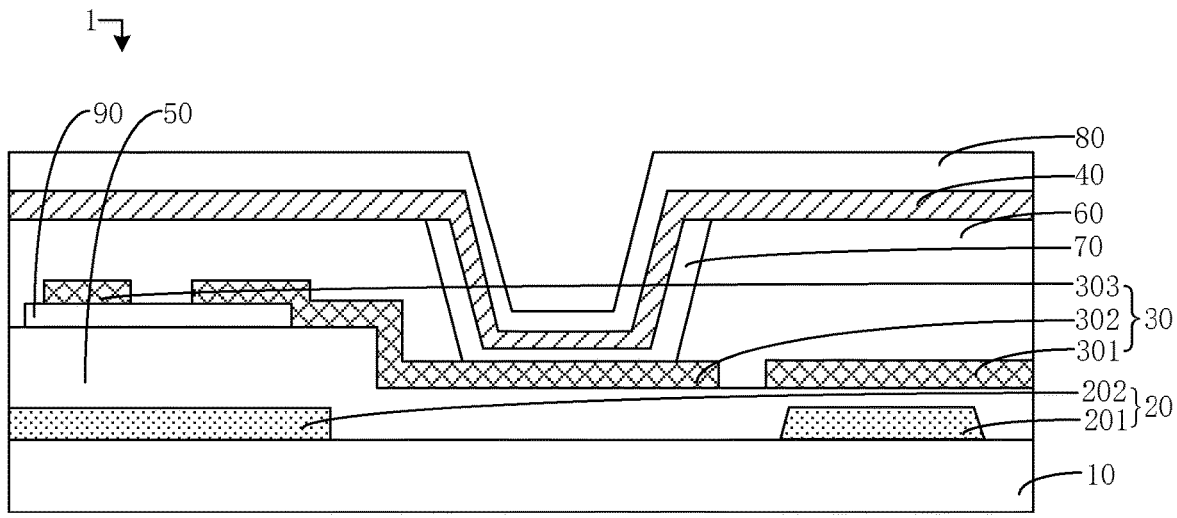
FIG. 1 is a sectional schematic view of an array substrate provided by the present application.

Referring to FIG. 1, an array substrate provided by the present application includes a first substrate 10, a first metal layer 20 disposed above the first substrate 10, a second metal layer 30 disposed on a side of the first metal layer 20 away from the first substrate 10, and a total reflection layer 40 disposed on a side of the second metal layer 30 away from the first substrate 10. The array substrate at least further includes a touch unit, and the touch unit is disposed on a side of the total reflection layer 40 facing the first substrate 10.

A gate insulating layer 50 is further provided on the side of the first metal layer 20 away from the first substrate 10. A side surface of the gate insulating layer 50 away from first substrate 10 is further provided with a source layer 90. The second metal layer 30 is arranged on a side of the active layer 90 away from the first substrate 10. A passivation layer 60 is provided on the side of the second metal layer 30 away from the first substrate 10. A first polyimide layer 80 is provided on a side of the total reflection layer 40 away from the first substrate 10.

The total reflection layer 40 is arranged as a whole, and is configured for reflecting ambient light and providing light for display.

In this embodiment, through arranging the touch unit on a side of the total reflection layer 40 adjacent to the first substrate 10, a total reflection display is not affected, and the touch unit and the total reflection array substrate are integrated as a whole. A close-range interaction function of the total reflection display panel is enhanced through the touch unit, and a versatility of display application scenarios is increased.

The technical solutions of the present application will now be described with reference to specific embodiments.

In an embodiment, the touch unit includes a first electromagnetic touch wire 201 and a second electromagnetic touch wire 301, the array substrate includes the first electromagnetic touch wire 201 and the second electromagnetic touch wire arranged in different layers, and the first electromagnetic touch wire 201 and the second electromagnetic touch wire 301 are arranged to intersect in a film thickness direction.

Adjacent first electromagnetic touch wires 201 are arranged in parallel to each other, and adjacent second electromagnetic touch wires 301 are arranged in parallel to each other.

In one embodiment, the first metal layer 20 is a gate layer, the second metal layer 30 is a source and drain layer, the source and drain layer include a source 302 and a drain 303 that are disposed in a same layer and at intervals, the first electromagnetic touch wire 201 and the gate layer are arranged in a same layer, and the second electromagnetic touch wire 301 and the source and drain layer are arranged in a same layer.

The gate layer includes a gate 202, and the first electromagnetic touch wires 201 and the gate 202 are spaced apart from each other.

The source and drain layer include the source 302 and the drain 303. The second electromagnetic touch wire 301 is spaced apart from the source 302 and spaced apart from the drain 303. A metal barrier layer 70 is disposed on the surface of a side of the source 302 away from the first substrate 10, and the metal barrier layer 70 is configured for protecting the source 302 at a via hole and preventing the source 302 from being corroded and oxidized.

In this embodiment, through arranging the first electromagnetic touch wire 201 and the gate layer on the same layer, arranging the second electromagnetic touch wire 301 and the source and drain layer on the same layer, additional processes for preparing the first electromagnetic touch wire 201 and the second electromagnetic touch wire 301 are not required and can reduce a number of process steps, simplify the processes, and reduce costs.

In an embodiment, the gate layer further includes a scan line arranged along a first direction, the source and drain layer includes a data line arranged along a second direction, the first electromagnetic touch wire 201 is arranged along the first direction, the second electromagnetic touch wire 301 is arranged along the second direction, and the first electromagnetic touch wire 201 and the second electromagnetic touch wire 301 are perpendicular to each other in the film thickness direction.

The first direction and the second direction are perpendicular to each other.

It can be understood that the first electromagnetic touch wire 201 is configured to determine that a touch position is located on one straight line in the first direction, then the second electromagnetic touch wire 301 is configured to determine that the touch position is located on another straight line in the second direction, and a point where the one straight line intersects with the other straight line is the touch position.

In an embodiment, in any TFT device, the source 302 and the drain 303 are disposed on a same side of the second electromagnetic touch wire 301.

The source 302 can be disposed in the second direction of the drain 303.

It can be understood that, since the second electromagnetic touch wire 301 is disposed in the same layer as the source 302 and the drain 303, and since a distance between the source and the drain in the prior art is relatively small, in order to prevent the second electromagnetic touch wire 301 from being connected to the drain 303 when disposed between the source 302 and the drain 303, which causes an abnormality such as a short circuit, the source 302 and the drain 303 are disposed on the same side of the second electromagnetic touch wire 301 so that the above-mentioned defects can be overcome, and an arrangement of the source 302 and the drain 303 in a same thin-film transistor (TFT) device does not affect an arrangement of the second electromagnetic touch wire 301.

In this embodiment, through improving arrangement positions of the source 302 and the drain 303, the source 302 and the drain 303 are located on the same side of the second electromagnetic touch wire 301 to prevent the second electromagnetic touch wire 301 from being connected to the source 302 or the drain 303.

In one embodiment, the adjacent first electromagnetic touch wires 201 are parallel to each other, at least three of the first electromagnetic touch wires 201 form a first loop, and the first electromagnetic touch wires 201 form a plurality of the first loops. The adjacent second electromagnetic touch wires 301 are parallel to each other, at least three of the second electromagnetic touch wires 301 form a second loop, and the second electromagnetic touch wires 301 form a plurality of the second loops.

The at least three first electromagnetic touch wires 201 include three first electromagnetic touch wires 201, and similarly, the at least three second electromagnetic touch wires 301 include three second electromagnetic touch wires 301.

It can be understood that the first loop and the second loop are configured to precisely locate the touch position. Specifically, the first loop formed by the three first electromagnetic touch wires 201 is taken as an example for description. Each of the first electromagnetic touch wire 201 included in the first loop corresponds to a signal channel, and the first electromagnetic touch wire 201 having a strongest signal is obtained by detecting signal strength of the first electromagnetic touch wire 201 in the middle of the first loop and is marked as a target wire. Since a contact position is adjacent to the target wire, and according to signal strengths of two adjacent first electromagnetic touch wires 201 of the target wire, the contact position can be determined to be closer to a direction of the target wire toward which of the adjacent first electromagnetic touch wires 201. Furthermore, according to signal strength differences between the target wire and the adjacent first electromagnetic touch wires 201, a vertical distance between the touch position and the target wire can be precisely positioned, a first virtual line parallel to the first touch signal wire can be obtained, and the touch position is located on the first virtual line. Similarly, the second electromagnetic touch wire 301 is positioned to obtain a second virtual wire parallel to the second touch signal wire, and the touch position is located on the second virtual wire. Since the first electromagnetic touch wire 201 is intersected with the second electromagnetic touch wire 301, an intersection of the first virtual line and the second virtual line is defined in the film thickness direction, and the intersection is the touch position that is required to be positioned. The touch position positioned by above-mentioned method has an advantage of high precision, which achieves precise positioning.

It should be noted that any one of the first loops includes three of the first electromagnetic touch wires 201: Xn, Xn+1, and Xn+2, wherein Xn+1 is located between adjacent Xn and Xn+2; any one of the second loops includes three of the second electromagnetic touch wires 301: Yn, Yn+1, Yn+2, wherein Yn+1 is located between adjacent Yn and Yn+2.

Taking the first loop including the three first electromagnetic touch wires 201: Xn, Xn+1, and Xn+2 as an example for description, when there is a touch contact, the touch position is determined by the following methods: Since a signal of Xn+1 closest to the touch position will be the strongest, Xn+1 with a strongest signal is the target line, and the first loop including the target line is determined according to the target line. The first loop further includes Xn and Xn+2 respectively located on two sides of the target wire. Through comparing a signal strength of Xn and a signal strength of Xn+2, the touch position is determined to be located on which of sides of Xn+1, and when the touch position is located on a side of the target adjacent to Xn, the signal strength of Xn is greater than the signal strength of Xn+2; when the touch position is located on a side of the target wire adjacent to Xn+2, the signal strength of Xn+2 is greater than the signal strength of Xn. In addition, according to signal strength difference between Xn, Xn+1, and Xn+2, a vertical distance between the touch position and Xn+1 can be positioned. Similarly, the touch position can be positioned according to Yn, Yn+1, and Yn+2. Since the first electromagnetic touch wire 201 and the second electromagnetic touch wire 301 are intersected, the precise positioning of the touch position can be determined.

In this embodiment, electromagnetic touch positioning is more precise than common touch positioning, which can reduce deviations and enhance user experience.

Figure 2:
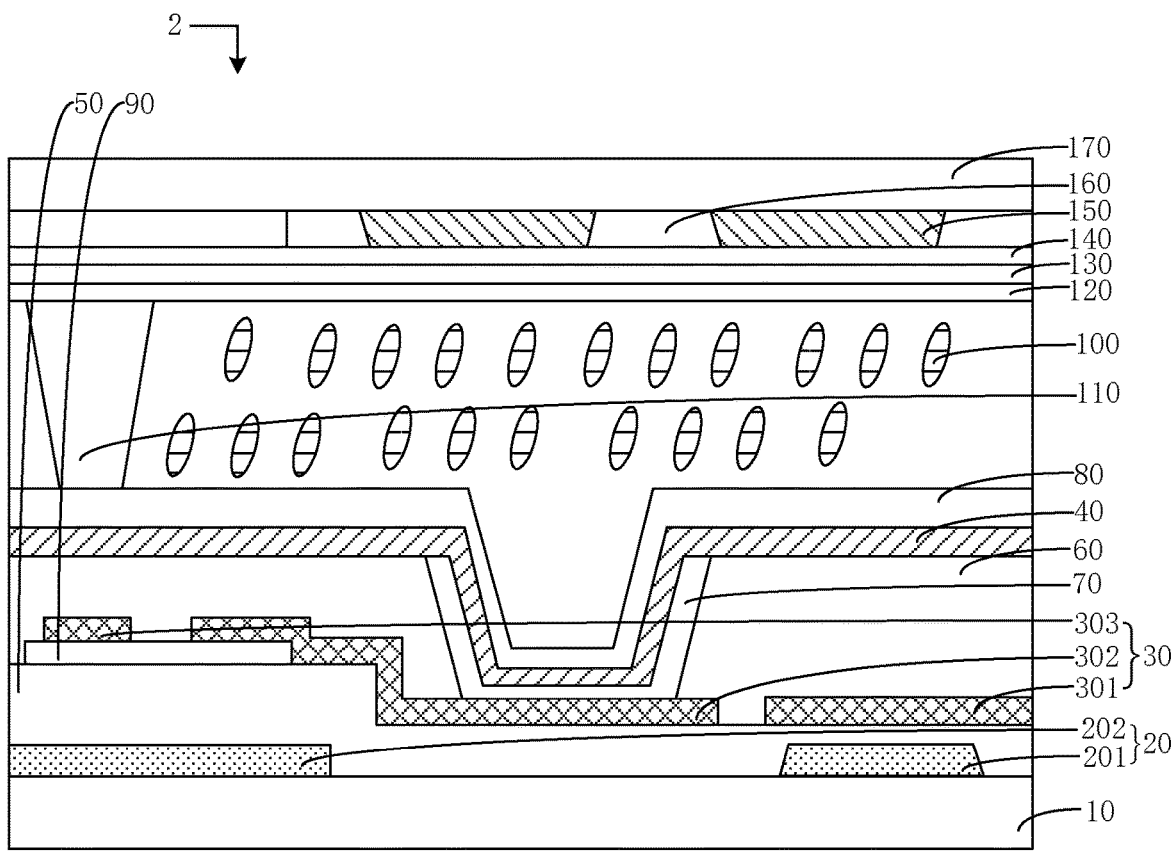
FIG. 2 is a first type of sectional schematic view of a total reflection display panel provided by the present application.

Referring to FIG. 2, a total reflection display panel of an embodiment of the present application includes a color filter substrate and the array substrate described in any of the above embodiments. The color filter substrate and the array substrate are arranged in a box. The array substrate includes a first substrate 10, a first metal layer 20 disposed above the first substrate 10, a second metal layer 30 disposed on a side of the first metal layer 20 away from the first substrate 10, and a total reflection layer 40 disposed on a side of the second metal layer 30 away from the first substrate 10. The array substrate at least further includes a touch unit, and the touch unit is disposed on a side of the total reflection layer 40 facing the first substrate 10.

The touch unit can include a first electromagnetic touch wire 201 and a second electromagnetic touch wire 301, the array substrate includes the first electromagnetic touch wire 201 and the second electromagnetic touch wire arranged in different layers, the first electromagnetic touch wire 201 and the second electromagnetic touch wire 301 are arranged to intersect in a film thickness direction, adjacent first electromagnetic touch wires 201 are arranged in parallel to each other, and adjacent second electromagnetic touch wires 301 are arranged in parallel to each other.

A gate insulating layer 50 is further provided on the side of the first metal layer 20 away from the first substrate 10. A side surface of the gate insulating layer 50 away from the first substrate 10 is further provided with a source layer 90. The second metal layer 30 is arranged on a side of the active layer 90 away from the first substrate 10. A passivation layer 60 is provided on the side of the second metal layer 30 away from the first substrate 10. A first polyimide layer 80 is provided on a side of the total reflection layer 40 away from the first substrate 10.

The total reflection layer 40 is arranged as a whole, and is configured for reflecting ambient light and providing light for display.

The color filter substrate further includes a second substrate 170, a color resist unit 150 and a black matrix 160 disposed on a same layer and on a side of the second substrate 170 adjacent to the array substrate, a planarization layer 140 disposed on a side of the color resist unit 150 and the black matrix 160 away from the second substrate 170, a transparent electrode layer 130 disposed on a side of the planarization layer 140 away from the second substrate 170, and a second polyimide layer 120 disposed on a side of the transparent electrode layer 130 away from the second substrate 170.

Preparation material of the transparent electrode layer 130 is a transparent material for increasing a transmittance of the total reflection display panel.

A barrier wall 110 and a liquid crystal 100 are further arranged between the color filter substrate and the array substrate.

In this embodiment, in the total reflection display panel, through arranging the touch unit on the side of the total reflection layer 40 adjacent to the first substrate 10, a total reflection display is not affected, and the touch unit and the total reflection array substrate are integrated as a whole. A close-range interaction function of the total reflection display panel is enhanced through the touch unit, and a versatility of display application scenarios is increased.

In an embodiment, the total reflection display panel includes a sub-pixel unit and a color resist unit 150 disposed on a side of the sub-pixel unit away from the first substrate 10. In the film thickness direction, a ratio of an area of the color resist unit 150 to an area of the sub-pixel unit is less than or equal to 1:2.

When the ratio of the area of the color resistance unit 150 to the area of the sub-pixel unit is equal to 1:2, it can also be referred to as a 50% color resistance design.

It can be understood that in the film thickness direction, a conventional sub-pixel unit is arranged to be completely covered by color resist. On such basis, removing half of an area of the color resist is the 50% color resistance design of the present application. Since a portion of light is also be blocked by the color resist, and light intensity of the total reflection display panel is relatively low, the transmittance of the total reflection display panel is particularly important, and the 50% color resistance design can enhance the transmittance of the total reflection display panel.

In this embodiment, through improving the color resistance, the area of the color resist is less than or equal to ½ of the area of the sub-pixel, and a blocking area of the color resist to light is reduced, thereby further enhancing the transmittance of the total reflection display panel.

In one embodiment, at least one side of the total reflection display panel includes a chip disposing region, the chip disposing region includes a central region H1 and an edge region H2 located outside the central region H1, and the chip disposing region is provided with a bonding chip 180.

Furthermore, in an embodiment, the edge region H2 of the chip disposing region is provided with the bonding chip 180.

In an embodiment, the first electromagnetic touch wire 201 or the second electromagnetic touch wire 301 is respectively connected to the bonding chip 180 in the edge region H2, and first electromagnetic touch wires 201 or second electromagnetic touch wires 301 are symmetrically arranged with respect to the central region H1.

It can be understood that, if the first electromagnetic touch wires 201 are arranged symmetrically with respect to the central region H1, a symmetry of the first electromagnetic touch wires 201 can be increased, and resistances of the first electromagnetic touch wires 201 can be reduced. If the second electromagnetic touch wires 301 are symmetrically arranged with respect to the central region H1, a symmetry of the second electromagnetic touch wires 301 can be increased, and resistances of the second electromagnetic touch wires 301 can be reduced.

It can be understood that when the first electromagnetic touch wires 201 are symmetrically arranged with respect to the central region H1 and are connected to the bonding chip in the edge region H2, wiring lengths of the first electromagnetic touch wires 201 can be reduced, thereby reducing an impedance of the first electromagnetic touch wires 201. Similarly, when the second electromagnetic touch wires 301 are symmetrically arranged with respect to the central region H1 and are connected to the bonding chip in the edge region H2, an impedance of the second electromagnetic touch wires 301 can also be reduced.

In this embodiment, through having the first electromagnetic touch wires 201 or the second electromagnetic touch wires 301 symmetrically arrange, the symmetry of the first electromagnetic touch wires 201 or the symmetry of the second electromagnetic touch wires 301 are increased, which can reduce a resistance of the electromagnetic touch unit, and reduce an impedance and a voltage drop.

Figure 3:
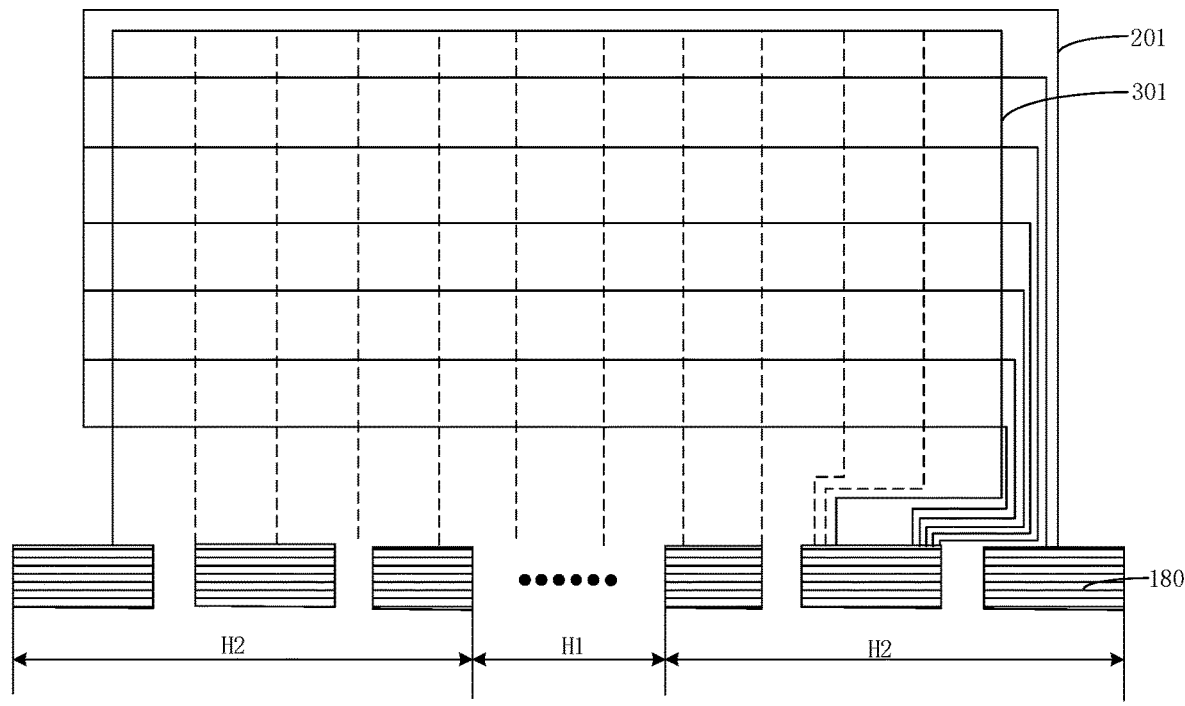
FIG. 3 is a first type of wiring schematic view of an electromagnetic touch unit of the total reflection display panel provided by the present application.

In an embodiment, referring to FIG. 3, the chip disposing region is a color filter on array (COA) region, and bonding chips 180 are arranged in the COA region.

The first electromagnetic touch wires 201 and the second electromagnetic touch wires 301 can respectively be connected to different bonding chips 180, so as to reduce a complexity of wiring and simplify a wiring solution.

The bonding chips 180 can be arranged in an array, and when the first electromagnetic touch wires 201 or the second electromagnetic touch wires 301 are also arranged at equal intervals, it is convenient for the bonding chips 180 to be connected to the first electromagnetic touch wires 201 or the second electromagnetic touch wires 301.

The first electromagnetic touch wires 201 and the second electromagnetic touch wires 301 can be connected to a same bonding chip 180, and the bonding chip 180 includes a plurality of pins, and the plurality of pins are connected to the first electromagnetic touch wires 201 or the second electromagnetic touch wires 301 in a one-to-one correspondence.

It can be understood that since the chip disposing region only includes the COA region, that is, the total reflection display panel can be without a gate on array (GOA) region. Through removing the GOA region, wires of the original GOA region are also connected to the COA region, thereby reducing a frame width.

It should be noted that since the GOA region on two sides are removed, the scan line, the data line, the first electromagnetic touch wires 201 and the second electromagnetic touch wires 301 are all connected to the bonding chip 180 of the COA region.

In this embodiment, through only providing the COA region on one side or two opposite sides of a display panel, and only arranging the bonding chips 180 in the COA region, wires such as the scan line are all connected to the bonding chips 180 in the COA region. Since a conventional GOA region is removed, the frame width of the total reflection display panel is reduced, and the total reflection display panel can achieve a narrow frame design.

In some embodiments, the first electromagnetic touch wires 201 and the second electromagnetic touch wires 301 can be connected to the same bonding chip 180 or can be connected to different bonding chips 180. The electromagnetic touch wires 201 and the second electromagnetic touch wires 301 can both be disposed in the edge region H2, or one of them can be disposed in the edge region H2 and another one of them can be disposed in the central region H1.

The bonding chips 180 can be chips on film (COF).

In this embodiment, through an arrangement of the first electromagnetic touch wires 201 and the second electromagnetic touch wires 301, the first electromagnetic touch wires 201 and the second electromagnetic touch wires 301 can be easier integrated in the total reflection display panel, without changing a design and an arrangement of a conventional bonding chip 180, thereby reducing costs of manufacturing the total reflection display panel.

Figure 4:
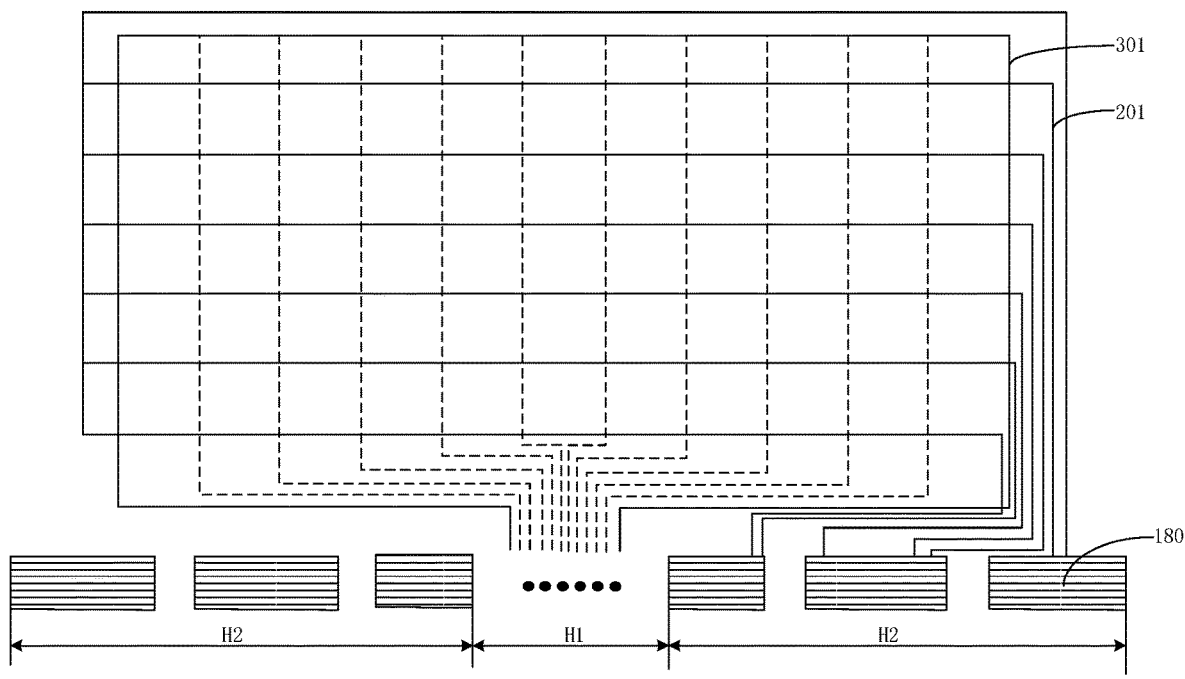
FIG. 4 is a second type of wiring schematic view of the electromagnetic touch unit of the total reflection display panel provided by the present application.

In an embodiment, referring to FIG. 4, the first electromagnetic touch wire 201 and the second electromagnetic touch wire 301 are connected to different bonding chips 180.

The first electromagnetic touch wire 201 is connected to the bonding chip 180 in the edge region H2, and the second electromagnetic touch wire 301 is connected to the bonding chip 180 in the central region H1.

Furthermore, the first electromagnetic touch wire 201 is only connected to the bonding chip 180 in the edge region H2 at an end of the chip disposing region.

It can be understood that, since the first electromagnetic touch is only connected to the bonding chip 180 at an end of the chip disposing region, a number of split-wiring of wiring is small.

In this embodiment, since the first electromagnetic touch wire 201 is connected to the bonding chip 180 in the edge region H2, and the second electromagnetic touch wire 301 is connected to the bonding chip 180 in the central region H1, additional improvements to a conventional electromagnetic wiring is not required, and a number of the bonding chips 180 can be reduced, thereby reducing the costs.

Figure 5:
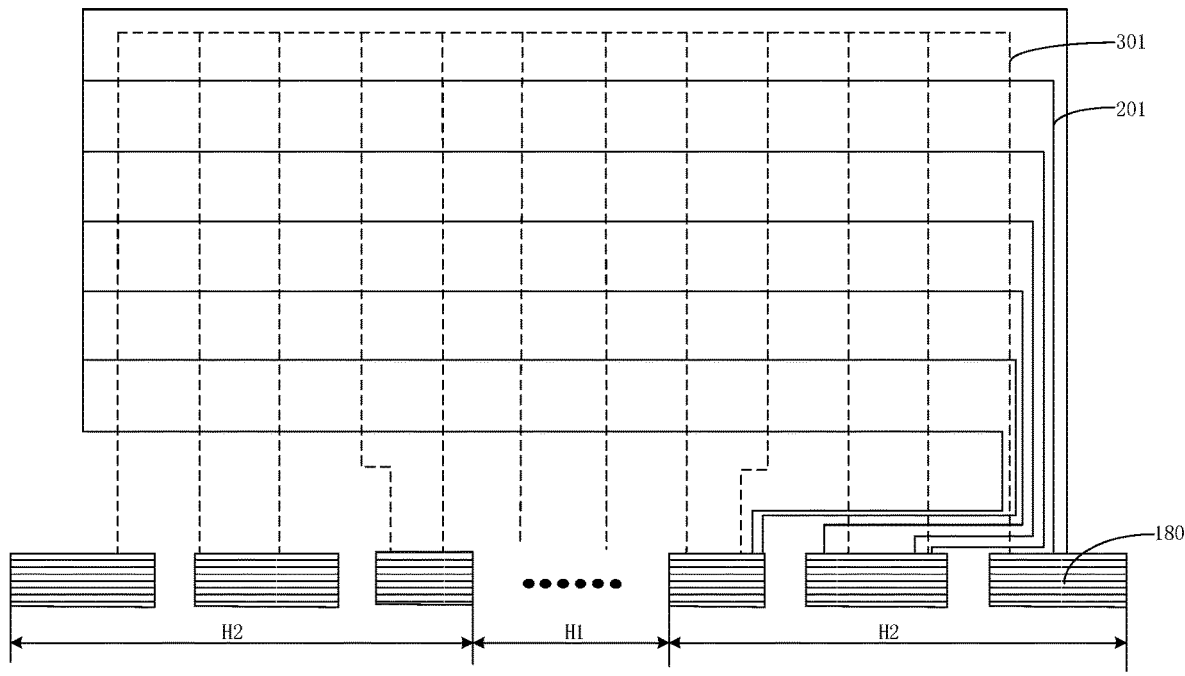
FIG. 5 is a third type of wiring schematic view of the electromagnetic touch unit of the total reflection display panel provided by the present application.

In an embodiment, referring to FIG. 5, the first electromagnetic touch wires 201 are connected to the bonding chips 180 in the edge region H2, and the second electromagnetic touch wires 301 are connected to the bonding chips 180 in the central region H1 and the edge region H2.

The first electromagnetic touch wires 201 are connected to the six outermost bonding chips 180 at one end of the chip disposing region; the first electromagnetic touch wires 201 are connected to six outermost ones of the bonding chips 180, and a design of the first electromagnetic touch wires 201 being connected to the six outermost bonding chips 180 is not required to change a wiring method of the conventional bonding chips 180, and can be applied to the total reflection display panel integrated with the electromagnetic touch unit, and has a lower cost compared to other wiring solutions.

It can be understood that through connecting the first electromagnetic touch wires 201 to the six outermost bonding chips 180 at an end of the chip disposing region, and connecting the second electromagnetic touch wires 301 to the bonding chips 180 in the central region H1 and the edge region H2, disadvantageous effect of splicing of the total reflection display panels can be reduced when the total reflection display panels are spliced.

In this embodiment, the splicing of the total reflection display panel is not affected, and widths of seams are reduced, which facilitates achieving a splicing display of the total reflection display panel.

In some embodiments, the total reflection display panel is further provided with an optical compensation layer 190 for increasing a viewing angle of light, and the optical compensation layer 190 is provided on a side of the total reflection layer 40 away from the first substrate 10.

Figure 6:
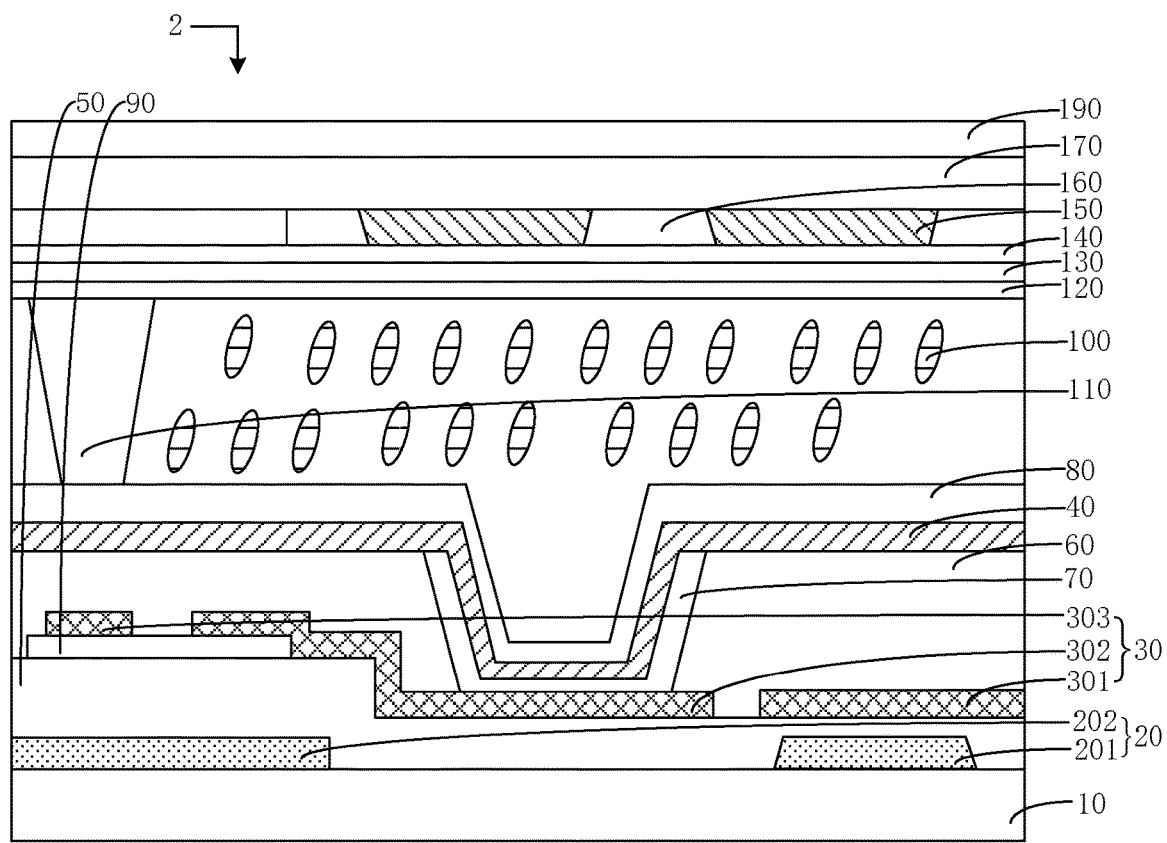
FIG. 6 is a second type of sectional schematic view of the total reflection display panel provided by the present application.

In one embodiment, referring to FIG. 6, the optical compensation layer 190 is a lens or a prism capable of diffusing light.

The optical compensation layer 190 can be configured for diffusing light and increasing the viewing angle of light.

In this embodiment, the optical compensation layer 190 can increase the viewing angle of the light, and achieve a large viewing angle of the total reflection display panel.

Figure 7:
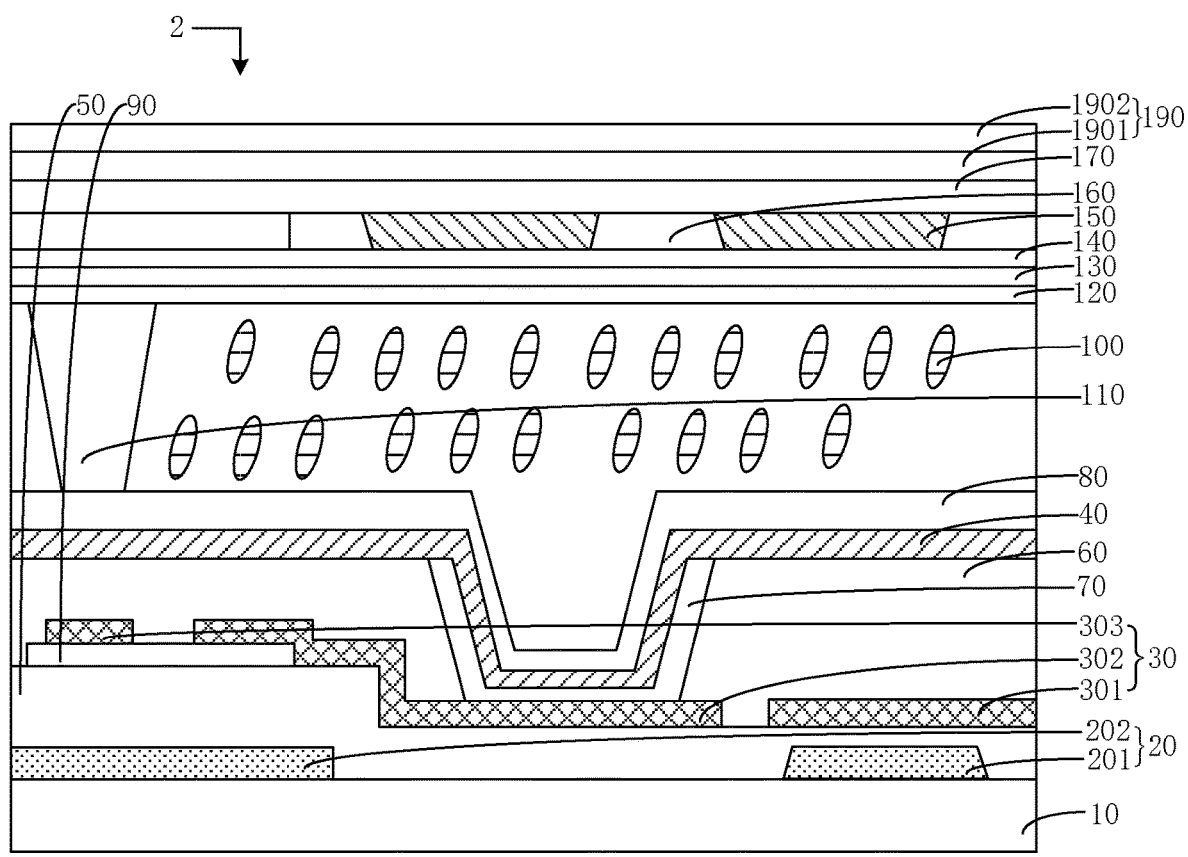
FIG. 7 is a third type of sectional schematic view of the total reflection display panel provided by the present application.

In an embodiment, referring to FIG. 7, the optical compensation layer 190 can further include a first optical compensation layer 1901, a second optical compensation layer 1902 disposed on a surface of the first optical compensation layer 1901 away from the first substrate 10. A refractive index of the first optical compensation layer 1901 is greater than a refractive index of the second optical compensation layer 1902.

It can be understood that through arranging the first optical compensation layer 1901 with a small refractive index and the second optical compensation layer 1902 with a large refractive index in stack, when the light reaches the second optical compensation layer 1902 from the first optical compensation layer 1901, since the light is entering the optically sparser medium from an optically denser medium, an angle between an incident beam and the normal is smaller than an angle between a reflected ray and the normal, so that a viewing angle of an emitting light is larger than a viewing angle of the incident light.

In this embodiment, through arranging the optical compensation layer 190 in a light-emitting direction of the array substrate, and through arranging the first optical compensation layer and the second optical compensation layer having different reflective indexes in stack, the viewing angle of light is enlarged, and the large viewing angle of the total reflection display panel is achieved.

The present application also proposes a display module and a display device. Both the display module and the display device include the above-mentioned array substrate, which will not be repeated here.

The array substrate provided in this embodiment includes the first substrate, the first metal layer disposed above the first substrate, the second metal layer disposed on the side of the first metal layer away from the first substrate layer, and the total reflection layer disposed on the side of the second metal layer away from the first substrate. The array substrate at least further includes the touch control unit, and the touch control unit is disposed on the total reflection layer facing the side of the first substrate. Through arranging the touch unit on the side of the total reflection layer adjacent to the first substrate, the total reflection display is not affected, and the touch unit and the total reflection array substrate are integrated as a whole. The close-range interaction function of the total reflection display panel is enhanced through the touch unit, and the versatility of display application scenarios is increased.

In the foregoing embodiments, the description of each embodiment has its own emphasis. For parts that are not described in detail in a certain embodiment, reference may be made to the relevant descriptions of other embodiments. In any of the foregoing embodiments, the first electromagnetic touch wires and the second electromagnetic touch wires are interchangeable, i.e., arrangement positions and connection relationships between the first electromagnetic touch wires and the second electromagnetic touch wires can be interchangeable to form new embodiments.

The array substrate and the total reflection display panel provided by the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. An array substrate comprising:
   a first substrate;
   a first metal layer, wherein the first metal layer is disposed above the first substrate;
   a second metal layer, wherein the second metal layer is disposed on a side of the first metal layer away from the first substrate; and
   a total reflection layer, wherein the total reflection layer is disposed as a whole on a side of the second metal layer away from the first substrate;
   wherein the array substrate at least further comprises a touch control unit, and the touch control unit is disposed on a side of the total reflection layer facing the first substrate;
   wherein the touch control unit comprises a first electromagnetic touch wire and a second electromagnetic touch wire arranged in different layers, the first electromagnetic touch wire and the second electromagnetic touch wire are arranged to intersect in a film thickness direction, and the first electromagnetic touch wire and the second electromagnetic touch wire are configured to obtain a touch position through electromagnetic touch positioning; and
   wherein the first metal layer is a gate layer, the second metal layer is a source and drain layer, the first electromagnetic touch wire and the gate layer are arranged in a same layer, and the second electromagnetic touch wire and the source and drain layer are arranged in a same layer.

2. The array substrate according to claim 1, wherein adjacent ones of first electromagnetic touch wires are arranged in parallel to each other and adjacent ones of second electromagnetic touch wires are arranged in parallel to each other.

3. The array substrate according to claim 1, wherein the gate layer comprises a gate, and the first electromagnetic touch wire and the gate are spaced apart from each other.

4. The array substrate according to claim 1, wherein the source and drain layer comprises a source and a drain, and the second electromagnetic touch wire is arranged spaced apart from the source and spaced apart from the drain.

5. The array substrate according to claim 1, wherein the gate layer further comprises a scan line arranged along a first direction, the source and drain layer comprise a data line arranged along a second direction, the first electromagnetic touch wire is arranged along the first direction, the second electromagnetic touch wire is arranged along the second direction, and the first electromagnetic touch wire and the second electromagnetic touch wire are perpendicular to each other in the film thickness direction.

6. The array substrate according to claim 1, wherein the source and drain layer comprises a source and a drain, and the source and the drain are disposed on a same side of the second electromagnetic touch wire.

7. The array substrate according to claim 2, wherein at least three of the first electromagnetic touch wires form a first loop, and the first electromagnetic touch wires form a plurality of the first loops, at least three of the second electromagnetic touch wires form a second loop, and the second electromagnetic touch wires form a plurality of the second loops.

8. A total reflection display panel, comprising the array substrate according to claim 1.

9. The total reflection display panel according to claim 8, wherein the total reflection display panel further comprises a sub-pixel unit, a color resist unit disposed on a side of the sub-pixel unit away from the first substrate, and a ratio of an area of the color resist unit to an area of the sub-pixel unit is less than or equal to 1:2 in the film thickness direction.

10. The total reflection display panel according to claim 8, wherein at least one side of the total reflection display panel comprises a chip disposing region, and the chip disposing region comprises a central region and an edge region located outside the central region, the edge region is provided with a bonding chip, the first electromagnetic touch wire or the second electromagnetic touch wire is respectively connected to the bonding chip in the edge region, and the first electromagnetic touch wire or the second electromagnetic touch wire are arranged symmetrically with respect to the central region.

11. The total reflection display panel according to claim 8, wherein at least one side of the total reflection display panel comprises a chip disposing region, and the chip disposing region comprises a central region and an edge region located outside the central region, and the first electromagnetic touch wire and the second electromagnetic touch wire are respectively connected to different bonding chips.

12. The total reflection display panel according to claim 11, wherein the first electromagnetic touch wire is connected to the bonding chip in the edge region, and the second electromagnetic touch wire is connected to the bonding chip in the central region.

13. The total reflection display panel according to claim 11, wherein the first electromagnetic touch wire is connected to six outermost ones of bonding chips at an end of the chip disposing region.

14. The total reflection display panel according to claim 11, wherein bonding chips are arranged in an array, when first electromagnetic touch wires or second electromagnetic touch wires are arranged at equal intervals.

15. The total reflection display panel according to claim 8, wherein at least one side of the total reflection display panel comprises a chip disposing region, and the chip disposing region comprises a central region and an edge region located outside the central region, the first electromagnetic touch wire and the second electromagnetic touch wire are connected to a same bonding chip, the bonding chip comprises a plurality of pins, and the plurality of pins are connected to the first electromagnetic touch wire or the second electromagnetic touch wire in a one-to-one correspondence.

16. The total reflection display panel according to claim 8, wherein the total reflection display panel is further provided with an optical compensation layer for increasing a viewing angle of light, the optical compensation layer is provided on a side of the total reflection layer away from the first substrate.

17. The total reflection display panel according to claim 16, wherein the optical compensation layer is a lens or a prism capable of diffusing light.

18. The total reflection display panel according to claim 16, wherein the optical compensation layer further comprises a first optical compensation layer and a second optical compensation layer disposed on a surface of a side of the first optical compensation layer away from the first substrate, and a refractive index of the first optical compensation layer is greater than a refractive index of the second optical compensation layer.

* * * * *